May 1, 1962  M. A. MEYER ETAL  3,032,748
COUNTING APPARATUS
Filed Feb. 29, 1956

INVENTORS
MAURICE A. MEYER
EDWARD D. OSTROFF
HARVEY RUBINSTEIN

BY Joseph Weingarten
ATTORNEY

United States Patent Office 3,032,748
Patented May 1, 1962

3,032,748
COUNTING APPARATUS
Maurice A. Meyer, Natick, Edward D. Ostroff, South Lincoln, and Harvey Rubinstein, Lynnfield Center, Mass., assignors to Laboratory for Electronics, Inc., Boston, Mass., a corporation of Delaware
Filed Feb. 29, 1956, Ser. No. 568,951
6 Claims. (Cl. 340—174)

This invention relates in general to bistable circuits and in particular to a novel circuit wherein passive bistable elements cooperate with a passive storage element to provide a compact, efficient, and highly reliable bistable circuit adaptable to being cascaded in the form of a counter which yields an output pulse in response to a predetermined number of input pulses.

The design of prior cascaded bistable circuits has been based upon amplification devices, such as vacuum tubes and transistors, whose characteristics fluctuate with variations in external conditions, such as temperature and supply voltage. While the bistable properties of magnetic cores are well known in the art and may be employed in bistable circuits in cooperation with amplification devices to alleviate some deficiencies inherent in the latter, there remain other undesirable aspects not thereby corrected.

Accordingly, it is a primary object of the invention to provide a highly reliable bistable circuit utilizing compact passive elements which consume relatively small amounts of power and generate negligible heat.

Another object of the invention is to provide a bistable circuit utilizing passive elements adaptable to being cascaded in the form of a counter.

A further object is to interconnect a magnetic core with a capacitor whereby they cooperate to provide a bistable circuit suitable for use as a counter.

Still another object is the provision of gating means whereby the novel magnetic core-capacitor bistable circuit may be cascaded to form counter chains.

Still a further object of the invention is to provide a bistable circuit which retains its binary mode despite appreciable variations in the input pulse width.

In its broadest form the invention is a bistable circuit comprising a bistable element capable of assuming first and second stable states, energy storage means coupled to said bistable element and energizable only when said bistable element is in the first stable state, an input terminal energizable to effect the assumption by the bistable element of the first stable state, and coupling means between the bistable element and storage means whereby energy stored in the latter may be utilized to return the former to its second stable state.

In a more specific form the bistable element preferably comprises, but need not be limited to, passive bistable and storage elements. As employed herein, a passive bistable element refers to a device which may be energized to assume a selected one of two stable states, remaining in either selected state without the application of power to the element. In a preferred embodiment, the bistable element is a magnetic core with a reset winding thereon serially connected to a capacitor, the preferred storage means. A source of pulses coupled across the reset winding and capacitor supplies input pulses of a first polarity which are effective in switching the core to its first stable state when it resides in its second stable state. However, the reset winding presents a relatively high impedance to the pulse source during the switching period so that a negligible portion of the pulse energy is available for charging the capacitor. When the core is in the first stable state, the next input pulse, being of said first polarity, is ineffective in changing the magnetic state of the core, and the impedance presented to the pulse source by the reset winding is then relatively low. Consequently, nearly all the energy in the pulse is utilized to charge the capacitor. When the latter pulse terminates, the capacitor discharges through the reset winding, thereby returning the core to its second stable state. Thus, only alternate input pulses are applied to the capacitor.

When the novel circuit is cascaded to form a counter, gating means are provided in the preferred embodiment to render a stage insensitive to voltage pulses derived across a core winding in a preceding stage in response to the discharge of the capacitor. A preferred method of selecting the time interval for sensitizing a stage to accept a pulse from the preceding stage is to utilize the input pulses to the counter as gating pulses by employing suitable coupling means. These and other objects and advantages will become apparent from the following specification when read with reference to the accompanying drawings in which:

In the preferred embodiment of the invention, magnetic cores of the type well known in the art having substantially rectangular hysteresis characteristics are the bistable elements, preferably operated along a minor hysteresis loop. Accordingly, the following brief description of the core behavior under typical operating conditions serves as background for understanding operation of the novel circuit. The flux density residing in a core is dependent upon the past history of the magnetic core. Thus, when a winding upon a core is energized with a relatively high current of a first polarity, it drives the core into the positive saturation region. When the current is removed from the winding, the core returns to a first stable state wherein it resides in a positive residual flux density. Conversely, when a relatively high current of opposite polarity energizes the winding and is then removed, the flux density within the core first attains a value in the negative saturation region and then resides at negative residual flux density near the saturation value. However, when the current of opposite polarity is relatively low, the flux density will not be driven into the negative saturation region and the residual flux density, corresponding to a second stable state, present in the core upon termination of said current will be appreciably different from the negative saturation value. Application and removal of current of the first polarity returns the core to the first stable state. Such operation is referred to as operation along a minor hysteresis loop. When the current energizing a core winding effects a change in the flux density from one stable state to the other, a relatively high impedance is presented by the winding. When the current applied thereto only effects a flux density change from the residual value to the saturation value in the same region, a relatively low impedance is presented to the winding.

Figure 1:
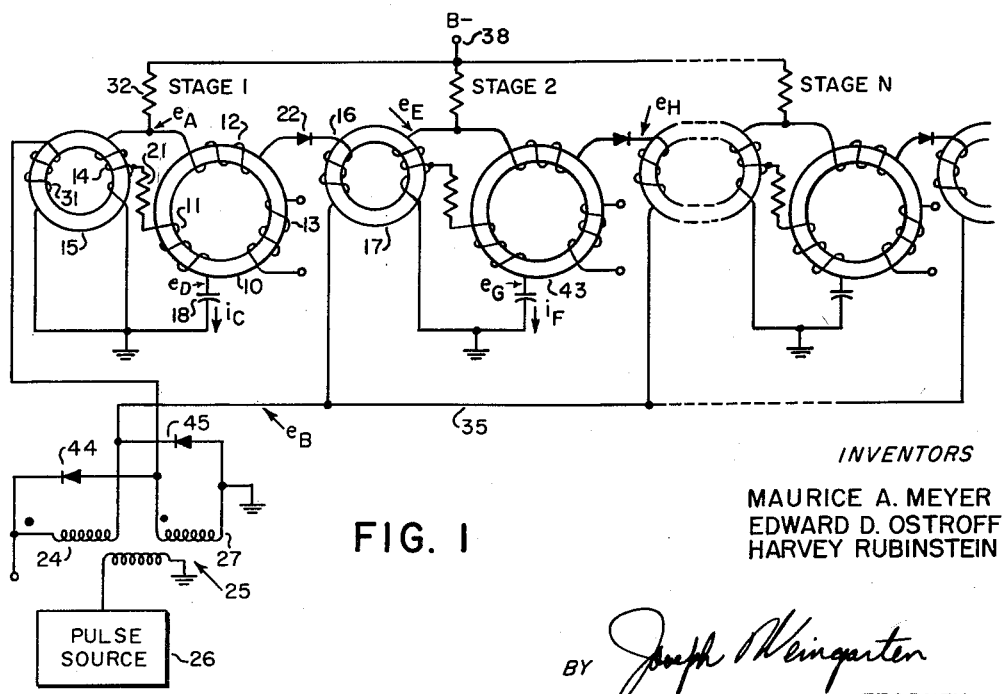
FIG. 1 is a schematic circuit diagram of the preferred embodiment.

The foregoing brief discussion of the characteristics of magnetic cores should facilitate understanding the description of FIG. 1 where is illustrated a schematic circuit diagram of a preferred embodiment of the invention arranged as a counter comprising the novel magnetic core bistable circuits in cascade. Core stage 1, a typical stage, comprises a magnetic core 10 with a reset winding 11, set winding 12, and an output winding 13 arranged thereon. Output winding 14 of core 15 is coupled to one termnial of winding 16 of core 17 by means of a coupling network which includes set winding 12 serially connected with diode 22. The tapped portion of secondary winding 14 is coupled to capacitor 18 through reset winding 11 and current limiting resistor 21. The other terminal of winding 16 is connected to winding 24 of transformer 25 whereby a positive input pulse from pulse source 26 is converted to a negative gating pulse. The other secondary 27 of transformer 25 couples a positive input pulse to winding 31 of input core 15. Resistor 32 couples a source of negative potential to the junction of windings 12 and 14. Subsequent stages are similarly connected and the reasons therefor will become apparent from the discussion of circuit operation which follows.

Figure 2:
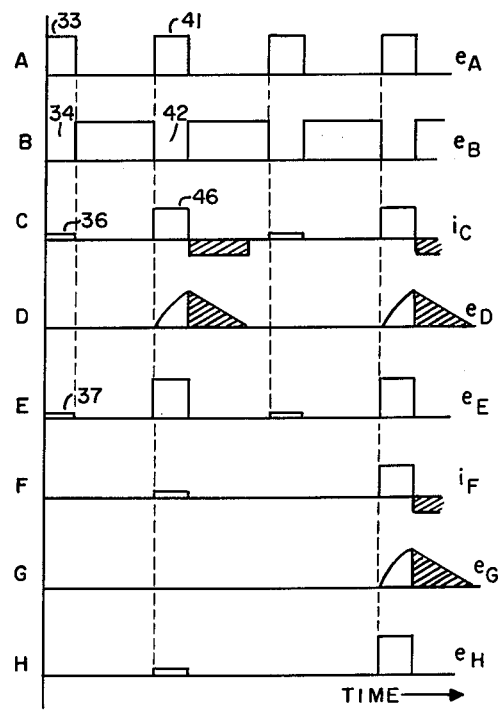
FIG. 2 is a graphical representation of signal waveforms at the points indicated in FIG. 1.

To facilitate the explanation of operational details, reference will be made to signal waveforms graphically represented as time functions in FIG. 2. Waveforms of FIG. 2 and points in FIG. 1 whereat said waveforms are observable are designated by the letter e for voltage waveforms and i for current waveforms, bearing corresponding subscripts.

To initiate the operational description, it is convenient to consider the first stage core 10 residing in a first stable state corresponding to a negative residual flux density therein. A positive input pulse applied to winding 31 is effective in setting core 15 whereby pulse 33 (FIG. 2A) is generated across winding 14, pulse 33 being effective in setting core 10 to a second stable state corresponding to a positive residual flux density therein. Simultaneously, a negative gating pulse is applied to the normally positive bus 35, enabling diode 22 to conduct and pulse 33, attenuated, is applied to winding 11. FIG. 2B shows the potential waveform on bus 35, the normally positive bus potential being reduced to zero by negative pulses induced across winding 24 during time intervals 34 and 42.

Since the core state is being switched, windings 11 and 12 present a relatively high impedance. Accordingly, the pulses applied thereto are largely dissipated thereat, resulting in current pulses 36 and 37 (FIGS. 2C and 2E) of negligible amplitude being applied to capacitor 18 and winding 16 respectively. Thus, capacitor 18 is not charged and core 17 is not set at this time. Upon the termination of pulse 33, current supplied from the negative supply source at terminal 38 through resistor 32 resets core 15 whereby only positive input pulses to winding 31 and winding 16 are effective in setting cores 15 and 17 respectively while remaining insensitive to noise. The positive pulses generated across windings 14 and 16 by transformer action in response to the setting of cores 15 and 17 respectively are of substantially constant amplitude as a result of the amplitude limiting effected by diodes 44 and 45 across windings 24 and 27 respectively, thereby enhancing counter stability.

The next input pulse initiates the generation across winding 14 of pulse 41 (FIG. 2A) which is applied to windings 12 and 16. Simultaneously, a gating pulse is generated across winding 24 (FIG. 1) which reduces the voltage on bus 35 to ground potential during the interval 42 (FIG. 2B), thereby rendering diode 22 conductive. Since core 10 is in the second stable state and therefore not switched by pulse 41, the impedance of winding 12 remains low and substantially all of pulse 41 is applied to winding 16 to switch core 17, the latter core bearing the same functional relationship to core 43 that core 15 bears to core 10. Winding 11 also presents a low impedance to the current resulting from pulse 41; hence, the latter pulse charges capacitor 18. When pulse 41 terminates, capacitor 18 discharges through resistor 21, winding 14 and winding 11, thereby resetting core 10. Since core 15 is reset by the current from the negative supply source, winding 14 presents a low impedance to the discharge current, thereby minimizing the energy which need be stored in capacitor 18. The effect, then, of capacitor 18 is to delay that input pulse 41 applied to the core 10 which is ineffective in switching said core and apply the delayed input pulse to said core in a manner which effects the resetting thereof to the first stable state.

A condition wherein the energy content of input pulses exceeds that necessary to drive the core just to the positive saturation region is undesirable because the input impedance presented by a core winding when the core has reached saturation is relatively low. Consequently, pulse energy beyond that necessary to drive the core just to saturation may charge capacitor 18 with sufficient energy to result in the core being reset on adjacent input pulses instead of on alternate input pulses as desired for binary operation.

The foregoing difficulty is readily overcome by the presence of a self-regulating feature in the novel circuit which accommodates marked fluctuations in the width of input pulses while still retaining its binary mode. This results from operating core 10 along a minor hysteresis loop. Thus, when the width of pulses effective in charging capacitor 18 increase, the correspondingly larger charge on the latter, which discharges through winding 11, resets core 10 to a second stable state closer to the negative saturation region. Accordingly, the following input pulse, effective in setting the core to the first stable state, requires a correspondingly increased energy content to drive core 10 into the positive saturation region.

The capacitor voltage waveforms in FIG. 2D is typical when the pulse duration is short compared to the charge and discharge time constants and illustrate the difference therebetween. This difference is explained by the charging of capacitor 18 occurring when core 10 is not switched and winding 14 presents a relatively low impedance, while discharge effects the switching of core 10, causing winding 14 to exhibit a relatively high impedance to the discharge of capacitor 18. Cross hatched areas indicate time intervals during which capacitors characterized by the waveform are discharging.

The configuration of stage 2 is a duplicate of stage 1; however, the former is energized by only half as many input pulses (FIG. 2E) as the latter. Other waveforms pertinent to stage 2 are illustrated in FIGS. 2F, 2G, and 2H, it being observed that there are half as many pulses in stage 2 as in stage 1 during corresponding periods. In general, stage N provides one output pulse for $2^N$ input pulses. The output pulse may be derived from a transformer core like core 17 or from a separate output winding like winding 13. Other circuit points wherefrom output pulses may be derived are observable by those skilled in the art. In the preferred embodiment illustrated, separate output windings are employed to permit the state of each stage to be determined, a desirable feature when the circuit operates in conjunction with computing apparatus.

In a circuit designed for operation where the input pulse rate was 5 kc., the following circuit parameters, materials and constructional details were employed:

```
Negative supply voltage_____ 20 volts.
Positive supply voltage_____ 22 volts.
Input and gating pulse ampli-
  tudes_____ 22 volts.
Input and gating pulse widths____ 2 to 10 microseconds.
Data cores 10 and 43_____ ¼" 20 wrap 4–79 Mo-
                                    Permalloy
                                    ¼" diameter x ⅛" core.
Windings 11 and 13_____ 150 turns of #40 wire.
Winding 12 _____ 500 turns of #40 wire.
Transformer cores 15 and 17_____ 50 wrap 4–79.
Mo-Permalloy _____ ½" diameter x ⅛" core.
Primary windings 31 and 16_____ 300 turns of #38 wire.
Secondary winding 14 tapped at
  100 turns_____ 300 turns of #38 wire.
```

The invention need not be limited to magnetic cores as bistable elements nor must the interstage transformers be embodied as bistable magnetic cores. Other storage and delay means may be employed to provide the useful result of the invention and numerous winding arrangements may be devised for effecting setting and resetting of the cores in the desired sequence within the principles disclosed herein. Thus, numerous departures from and modifications of the specific circuit described above may be made by those skilled in the art without departing from the inventive concepts disclosed herein. Consequently, the invention is to be construed as limited only by the spirit and scope of the appended claims.

What is claimed is:

1. A bistable circuit comprising, a first bistable magnetic core with set and reset windings thereon, an input transformer core with primary and secondary windings thereon, said secondary winding having a center tap, a source of potential of a first polarity, a common terminal, a capacitor connected to said common terminal, a current limiting resistor and said reset winding serially connected between said capacitor and said center tap, a resistor connected between said potential source and a terminal point to which said secondary winding and said set winding are connected, an output transformer core with at least a primary winding thereon, a diode connected between said set winding and said output transformer core primary winding, a second source of direct potential of polarity opposite to said first polarity, a source of pulses, a pulse transformer with a primary connected to said source of pulses and having first and second secondary windings, said first secondary winding connected to the primary winding of said input transformer core and said second secondary winding connected between said second source of direct potential and said output transformer core primary winding, the windings on said pulse transformer being arranged so that pulses derived across said first and second secondary windings relative to said common terminal are oppositely phased.

2. A bistable circuit comprising input, output and data magnetic cores each having first and second stable states, means for switching said input core to said first stable state, set and reset windings on said data core, a capacitor connected to said reset winding, means for energizing said set winding in response to said input core being switched to said first stable state whereby the data core assumes said first stable state, means for energizing said capacitor through said reset winding only when the data core is in said first stable state, means for energizing said output core only when said data core is in the first stable state, means for returning said input and output cores to the second stable state after having been switched to the first stable state, and means for returning said data core to the second stable state by discharging said capacitor through said reset winding.

3. A bistable circuit comprising input, output, and data cores, each core having first and second stable states, set and reset windings on said data core and primary and tapped secondary windings on said input and output cores, first and second direct potential sources of opposite polarity, means for energizing the primary of said input core with a pulse whereby the latter is switched to the first stable state to provide an excitation pulse across the secondary winding of the input core, a diode coupling said set winding to the output core primary winding, said output core primary winding being coupled to said first source of direct potential to maintain said diode non-conductive except when said input core is in the first stable state, a capacitor coupled to a tapped portion of the input core secondary winding by coupling means including said reset winding, whereby said capacitor is charged by said excitation pulse when said data core is in the first stable state, means for effecting the assumption by the data core of the first stable state in response to said excitation pulse, means for establishing the first stable state of said output core in response to said excitation pulse only when said data core is in the first stable state, coupling means between said second source of direct potential and said input and output cores for returning the latter cores to the first stable state after the input pulses thereto are terminated, and means for discharging said capacitor through said reset winding to return said data core to the second stable state.

4. A bistable circuit comprising input and output cores having positive and negative stable states, a data magnetic core having set and reset windings thereon and operated along a minor hysteresis loop said data core residing in one of two stable states a first stable state corresponding to a first residual flux density therein near a first saturation region and a second stable state corresponding to a residual flux density therein markedly different from the saturation value in the region opposite to said first saturation region, a capacitor energizable through said reset winding on said data core, means for energizing said set winding in response to said input core being switched to said positive stable state whereby the data core assumes said first stable state, means for energizing said capacitor through said set winding only when the data core is in said first stable state, means for switching said output core to the positive stable state only when said data core is in the first stable state, means for returning said input and output cores to the negative stable state after having been switched to the positive stable state, and means for discharging said capacitor through said reset winding to return said data core to said second stable state.

5. A counter with each stage comprising an input core having positive and negative stable states, a data magnetic core with set and reset windings thereon and operated along a minor hysteresis loop said data core assuming one of two stable states a first stable state corresponding to a residual flux density therein near a first saturation region and a second stable stage corresponding to a residual flux density therein markedly different from the saturation value in a region opposite to said first saturation region, means for switching said input core to the positive stable state, a capacitor energizable through said reset winding on said data core only when the latter is in said first stable state, means for energizing said set winding in response to said input core being switched to the positive stable state whereby the data core assumes said first stable state, means for energizing said capacitor through said reset winding only when said data core is in said first stable state, means for switching the input core of the next stage to the positive stable state only when said data core is in the first stable state, means for returning said input core to the negative stable state after having been switched to the positive stable state, and means for discharging said capacitor through said reset winding to return said data core to said second stable state.

6. A bistable circuit comprising input and output cores having positive and negative stable states, a data magnetic core operated along a minor hysteresis loop whereby it may assume a first stable state corresponding to a residual flux density therein relatively near the saturation value in a first region and a second stable state corresponding to a residual flux density therein markedly different from the saturation value in a region opposite to said first region, set and reset windings on said data core and primary and secondary windings on said input and output cores, first and second direct potential sources of opposite polarity, means for energizing the primary of said input core with a pulse whereby the latter is switched to the positive stable state to provide an excitation pulse across the secondary winding of the input core, a diode coupling said set winding to the output core primary winding, said output core primary winding being coupled to said first source of direct potential whereby said diode is rendered conductive only during intervals when said input core is in the first stable state, a capacitor coupled to a tapped portion of the input core secondary winding by coupling means including said reset winding whereby said capacitor is charged by said excitation pulse only when said data core is in the first stable state, means responsive to said excitation pulse for establishing the first stable state in said data core, means responsive to said excitation pulse only when said data core is in the first stable state for establishing the positive stable state in said output core, coupling means between said second source of direct potential and said input and output cores for returning the latter cores to the negative stable state after the input pulses thereto are terminated, and means for discharging said capacitor through said reset winding to return said data core to said second stable state.

References Cited in the file of this patent

UNITED STATES PATENTS

| | | |
|---|---|---|
| 2,680,819 | Booth | June 8, 1954 |
| 2,713,675 | Schmitt | July 19, 1955 |
| 2,753,545 | Lund | July 3, 1956 |
| 2,758,221 | Williams | Aug. 7, 1956 |
| 2,769,925 | Saunders | Nov. 6, 1956 |
| 2,778,006 | Guterman | Jan. 15, 1957 |
| 2,781,504 | Canepa | Feb. 12, 1957 |
| 2,832,062 | Tracy | Apr. 22, 1958 |
| 2,847,659 | Kaiser | Aug. 12, 1958 |